(12) United States Patent
Yoshihara

(10) Patent No.: US 11,769,993 B2
(45) Date of Patent: Sep. 26, 2023

(54) ELECTRICAL JUNCTION BOX HOUSING

(71) Applicant: Sumitomo Wiring Systems, Ltd., Yokkaichi (JP)

(72) Inventor: Hiroki Yoshihara, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 195 days.

(21) Appl. No.: 17/366,646

(22) Filed: Jul. 2, 2021

(65) Prior Publication Data

US 2022/0006275 A1 Jan. 6, 2022

(30) Foreign Application Priority Data

Jul. 3, 2020 (JP) .................... 2020-115518

(51) Int. Cl.
*H02G 3/08* (2006.01)
*H02G 3/14* (2006.01)

(52) U.S. Cl.
CPC .............. *H02G 3/088* (2013.01); *H02G 3/14* (2013.01)

(58) Field of Classification Search
CPC ............ H02G 3/14; H02G 3/08; H02G 3/081; H02G 3/088; H05K 5/06; H05K 5/04; H05K 5/0004; H05K 5/061; H05K 5/069; H05K 5/03; H05K 5/0217; B60R 16/02; B60R 16/00
USPC ............. 174/50, 520, 535, 559, 560, 66, 67, 17 R, 174/561, 564; 220/3.2–3.9, 4.02, 241, 220/242; 361/600, 601
See application file for complete search history.

(56) References Cited

U.S. PATENT DOCUMENTS

| 3,825,148 | A | * | 7/1974 | Hunter | H01F 27/02 174/37 |
| 3,974,933 | A | * | 8/1976 | Toth | E05B 65/006 220/88.1 |
| 4,664,281 | A | * | 5/1987 | Falk | H02G 3/088 174/547 |
| 6,455,768 | B2 | * | 9/2002 | Negishi | H05K 5/061 174/50 |
| 6,629,619 | B2 | * | 10/2003 | Sato | H02G 3/088 220/3.8 |
| 6,822,161 | B2 | * | 11/2004 | Komatsu | H05K 5/061 174/367 |
| 6,831,222 | B2 | * | 12/2004 | Pastuch | H02G 15/043 174/58 |

(Continued)

FOREIGN PATENT DOCUMENTS

JP 2001-238326 A 8/2001

*Primary Examiner* — Angel R Estrada
(74) *Attorney, Agent, or Firm* — Honigman LLP

(57) ABSTRACT

An electrical junction box housing includes: a case having an opening portion; a cover closes the opening portion; and a gasket fitted to a groove portion of the opening portion. The groove portion includes a case-side seal face in contact with the gasket, an inner wall is located on the inner side of the case-side seal face and protrudes upward, and an outer wall is located on the outer side of the case-side seal face and protrudes upward. The cover includes a cover-side seal face in contact with the gasket, and a water stop wall protruding downward from the outer side of the cover-side seal face. A first clearance is formed in the vertical direction between the water stop wall and an outer surface of the case, and a second clearance is formed in the radial direction between the water stop wall and the outer wall.

4 Claims, 7 Drawing Sheets

(56) References Cited

U.S. PATENT DOCUMENTS

| | | | | |
|---|---|---|---|---|
| 7,208,678 | B2 * | 4/2007 | Shinmura | H05K 7/20927 |
| | | | | 174/50 |
| 8,053,668 | B2 * | 11/2011 | Lai | H05K 9/0009 |
| | | | | 277/641 |
| 8,492,651 | B2 * | 7/2013 | Schindler | H05K 5/061 |
| | | | | 174/50 |
| 8,796,548 | B2 * | 8/2014 | Rost | H05K 5/061 |
| | | | | 174/50 |
| 8,937,246 | B2 * | 1/2015 | Yamaguchi | H05K 5/061 |
| | | | | 174/50 |
| 8,963,000 | B2 * | 2/2015 | Xiao | H02G 3/16 |
| | | | | 174/548 |
| 9,192,083 | B2 * | 11/2015 | Moon | H05K 9/0007 |
| 11,063,413 | B2 * | 7/2021 | Kawashita | B60R 16/0239 |

* cited by examiner

ELECTRICAL JUNCTION BOX HOUSING

CROSS-REFERENCE TO RELATED APPLICATIONS

This claims priority of Japanese Patent Application No. JP 2020-115518 filed on Jul. 3, 2020, the contents of which are incorporated herein.

TECHNICAL FIELD

The present disclosure relates to an electrical junction box housing.

BACKGROUND

JP 2001-238326A is a conventionally known example of a waterproof seal structure for an electrical junction box that is constituted by a box body and a cap cover. In the waterproof seal structure for an electrical junction box disclosed in JP 2001-238326A, the box body is closed by the cap cover with a gasket fitted between abutting surfaces of the box body and the cap cover.

If such an electrical junction box as described above is installed in an engine room of a vehicle such as an electrical automobile, the electrical junction box may be exposed to salt water. If, due to capillary action, salt water accumulates outside the gasket of the electrical junction box, moisture will evaporate and the concentration of salt will increase. Highly-concentrated salt water will corrode the electrical junction box if it is made of metal, incurring a risk that the waterproof performance of the electrical junction box will decrease.

The present disclosure has been accomplished in view of the above-described circumstances, and an object thereof is to provide an electrical junction box housing that prevents a decrease in waterproof performance due to exposure to salt water.

SUMMARY

According to the present disclosure, an electrical junction box housing includes: a case that is made of metal, and has an opening portion that is open in a vertical direction; a cover that closes the opening portion from above; and a gasket that is ring-shaped, and is fitted to a groove portion formed in a hole edge portion of the opening portion, wherein the groove portion includes a case-side seal face that is in contact with the gasket from below, an inner wall that is located on an inner side of the case-side seal face in a radial direction and protrudes upward, and an outer wall that is located on an outer side of the case-side seal face in the radial direction and protrudes upward, the cover includes a cover-side seal face that is in contact with the gasket from above, and a water stop wall that is located on an outer side of the cover-side seal face in the radial direction and protrudes downward, a first clearance is formed in the vertical direction between the water stop wall and an outer surface of the case, and a second clearance is formed in the radial direction between the water stop wall and the outer wall.

Advantageous Effects of Disclosure

According to the present disclosure, it is possible to provide an electrical junction box housing that prevents a decrease in waterproof performance due to exposure to salt water.

DETAILED DESCRIPTION OF PREFERRED EMBODIMENTS

Figure 1:
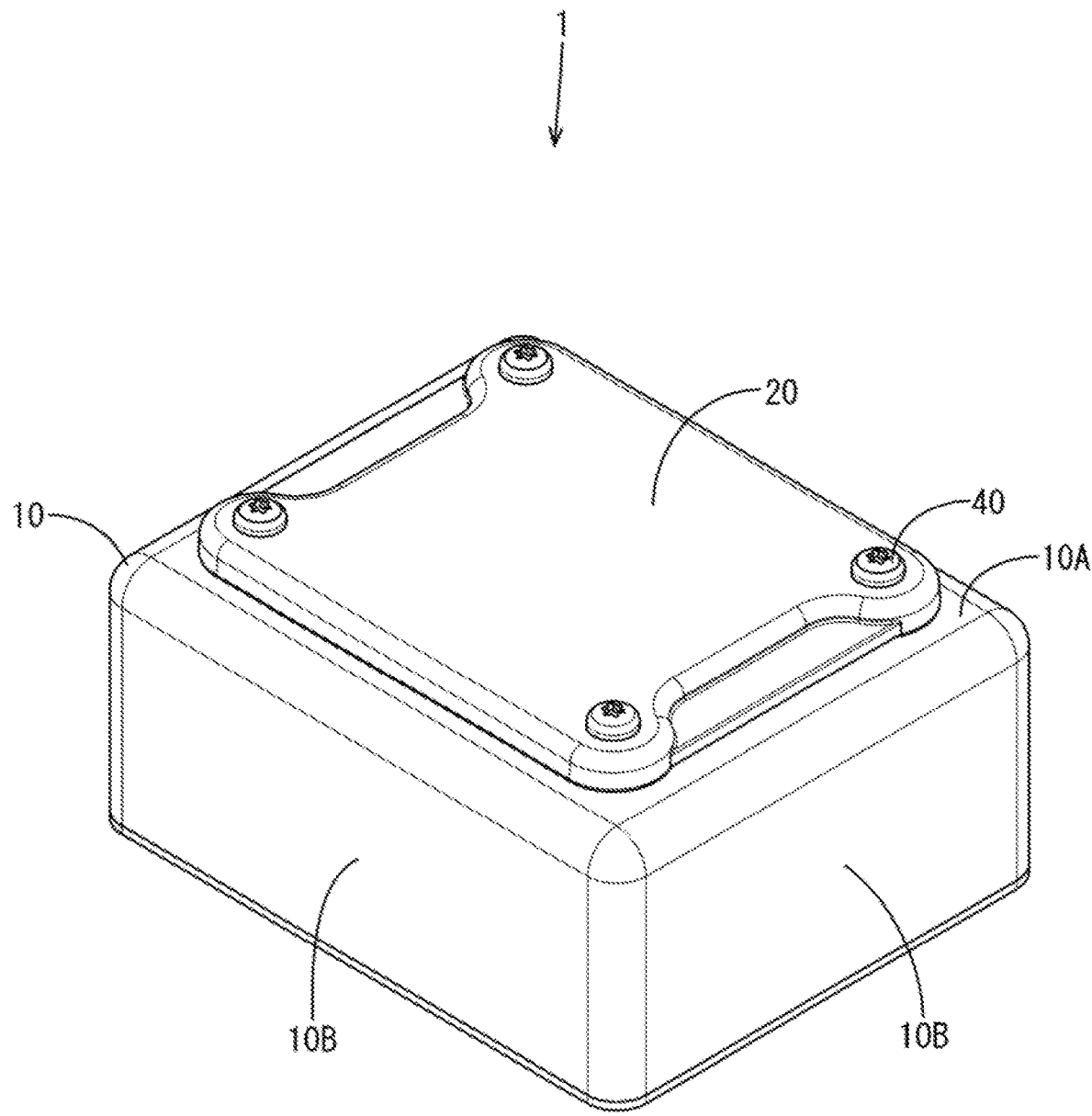
FIG. 1 is a perspective view of an electrical junction box housing according to the present embodiment.

First, embodiments of the present disclosure will be listed and described.

The electrical junction box housing according to the present disclosure includes: a case that is made of metal, and has an opening portion that is open in a vertical direction; a cover that closes the opening portion from above; and a gasket that is ring-shaped, and is fitted to a groove portion formed in a hole edge portion of the opening portion, wherein the groove portion includes a case-side seal face that is in contact with the gasket from below, an inner wall that is located on an inner side of the case-side seal face in a radial direction and protrudes upward, and an outer wall that is located on an outer side of the case-side seal face in the radial direction and protrudes upward, the cover includes a cover-side seal face that is in contact with the gasket from above, and a water stop wall that is located on an outer side of the cover-side seal face in the radial direction and protrudes downward, a first clearance is formed in the vertical direction between the water stop wall and an outer surface of the case, and a second clearance is formed in the radial direction between the water stop wall and the outer wall. Here, the "radial direction" refers to a direction of a normal to a central axis line, which extends in the vertical direction in the center of the opening of the opening portion, and the side close to the central axis line is referred to as "inner side in the radial direction", and the side away from the central axis line is referred to as "outer side in the radial direction".

With such a configuration, since the outer wall is provided protruding upward, water is unlikely to flow over the outer wall and reach the case-side seal face or the cover-side seal face due to gravity. Also, since the first clearance and the second clearance are formed between the case and the cover, capillary action is unlikely to occur and thus it is possible to further prevent water from reaching the upper side of the outer wall. Accordingly, even if the electrical junction box housing is exposed to salt water, it is possible to suppress a decrease in waterproof performance that may occur due to corrosion.

Preferably, the case-side seal face is provided on the upper side relative to a face of the outer surface of the case that is opposed to the water stop wall.

With such a configuration, the outer wall can be provided protruding further upward relative to the outer surface of the case, and thus water is unlikely to flow over the outer wall and reach the case-side seal face or the cover-side seal face.

Preferably, the cover-side seal face is in surface contact with both an upper end of the inner wall and an upper end of the outer wall.

With such a configuration, the case and the cover each have two contact surfaces, and thus it is possible to reliably attach the cover to the case.

The following will describe embodiments of the present disclosure. The present disclosure is not limited to these examples but is indicated by the claims, and all modifications within the meaning and scope equivalent to the claims are intended to be included.

Embodiment

The following will describe an embodiment of the present disclosure with reference to FIGS. 1 to 7. An electrical junction box housing 1 of the present embodiment is installed in, for example, a vehicle such as an electrical automobile or a hybrid automobile, and is designed to be connected to a terminal of a wire harness routed in the vehicle (not shown). A plurality of not-shown electronic components are housed inside the electrical junction box housing 1. The electrical junction box housing 1 is installed at a position at which it may be exposed to water such as salt water when the vehicle is used.

Electrical Junction Box Housing

Figure 2:
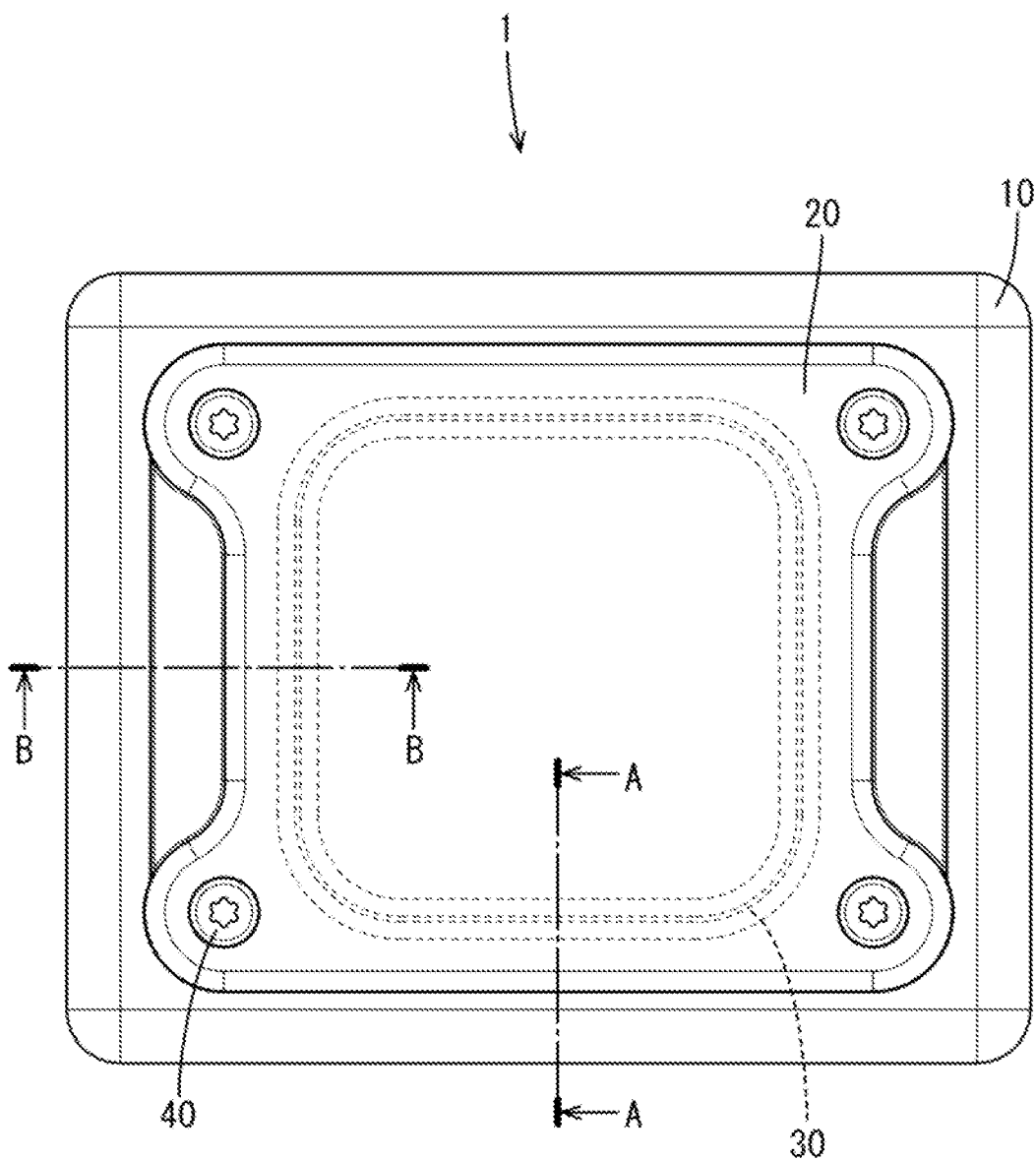
FIG. 2 is a plane view illustrating the electrical junction box housing.

As shown in FIG. 2, the electrical junction box housing 1 includes a case 10, a cover 20 that covers the case 10 from above (front side of the paper plane of FIG. 2), and a gasket 30 arranged between the case 10 and the cover 20.

Case and Opening

Figure 3:
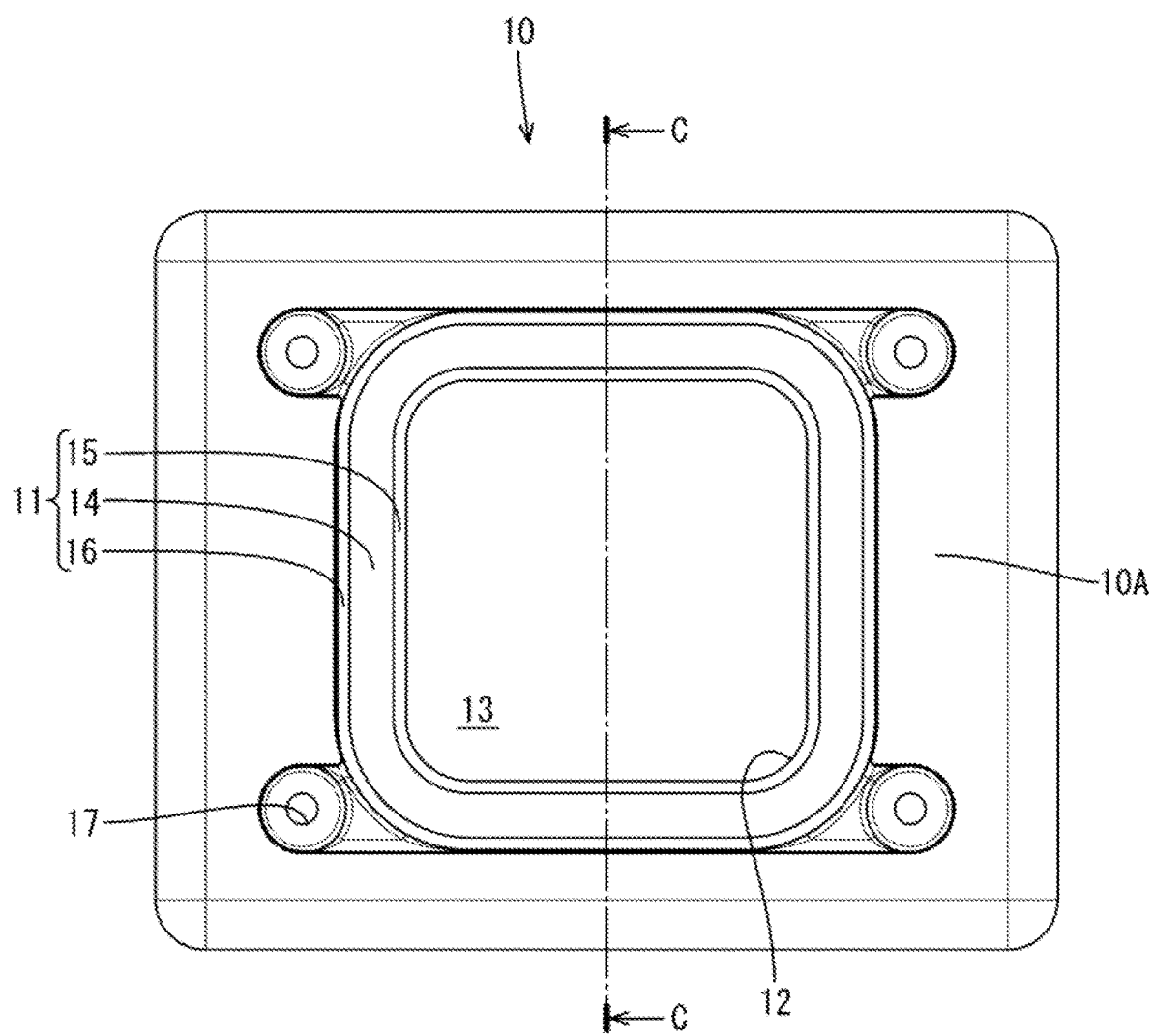
FIG. 3 is a plane view illustrating a case.

The case 10 is made of a metal such as aluminum, and has the shape of a cuboid box as shown in FIG. 1. The case 10 includes a top wall 10A, a bottom wall (not shown) located below and opposite to the top wall 10A, and a plurality of side walls 10B that connect the top wall 10A and the bottom wall. As shown in FIG. 3, the top wall 10A includes an opening portion 12 that is open in a vertical direction (perpendicular to the paper plane of FIG. 3). The opening portion 12 is rectangular when viewed in a plan view. The space inside the case 10 that is located on the far side of the opening portion 12 with respect to the paper plane of FIG. 3 is defined as an inner space 13.

Figure 7:
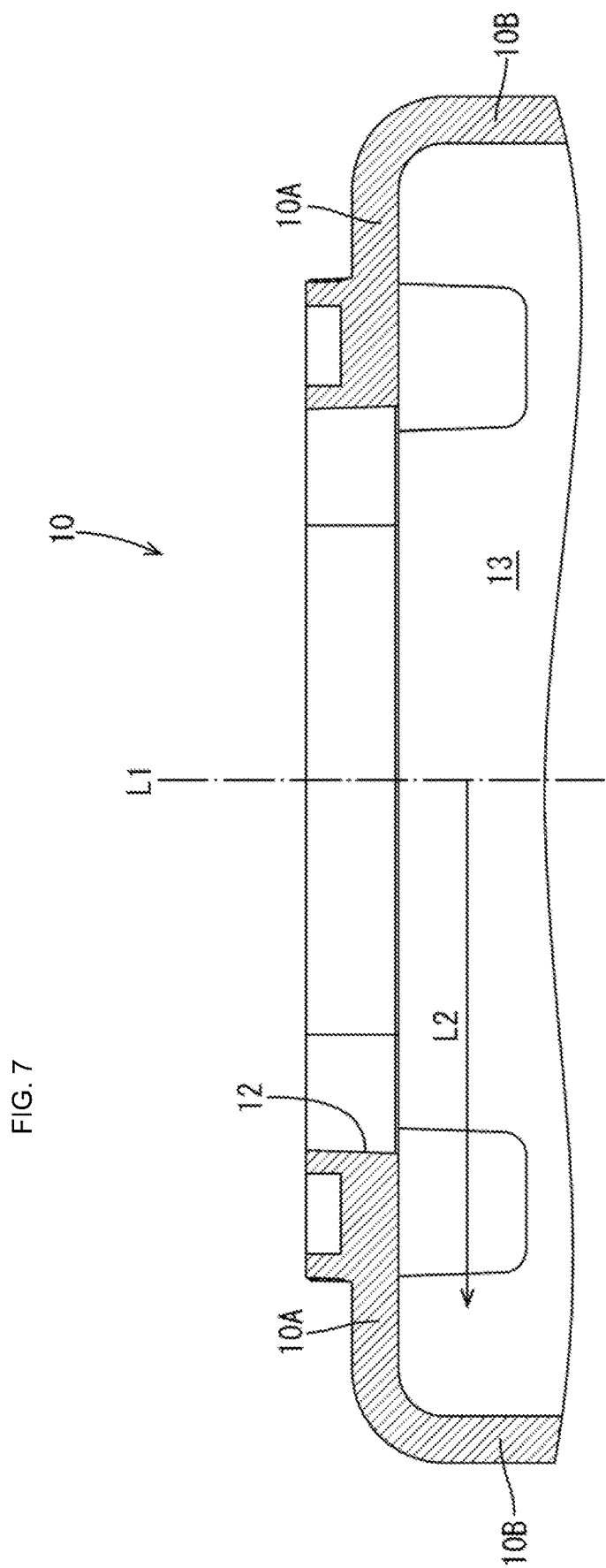
FIG. 7 is an enlarged cross-sectional view taken along a line C-C in FIG. 3, illustrating an upper portion of the case.

The following will describe a direction perpendicular to the vertical direction, using a radial direction. As shown in FIG. 7, "radial direction" refers to a direction of a normal to a central axis line L1, which extends in the vertical direction in the center of the opening of the opening portion 12, and the side close to the central axis line L1 is referred to as the "inner side in the radial direction", and the side away from the central axis line L1 is referred to as the "outer side in the radial direction". When a radial direction that is based on a normal L2 to the central axis line L1 that extends to the left in FIG. 7 is taken as an example, the relatively right side in FIG. 7 is the inner side in the radial direction, and the relatively left side in FIG. 7 is the outer side in the radial direction.

Groove Portion, Case-Side Seal Face, Inner Wall, and Outer Wall

Figure 5:
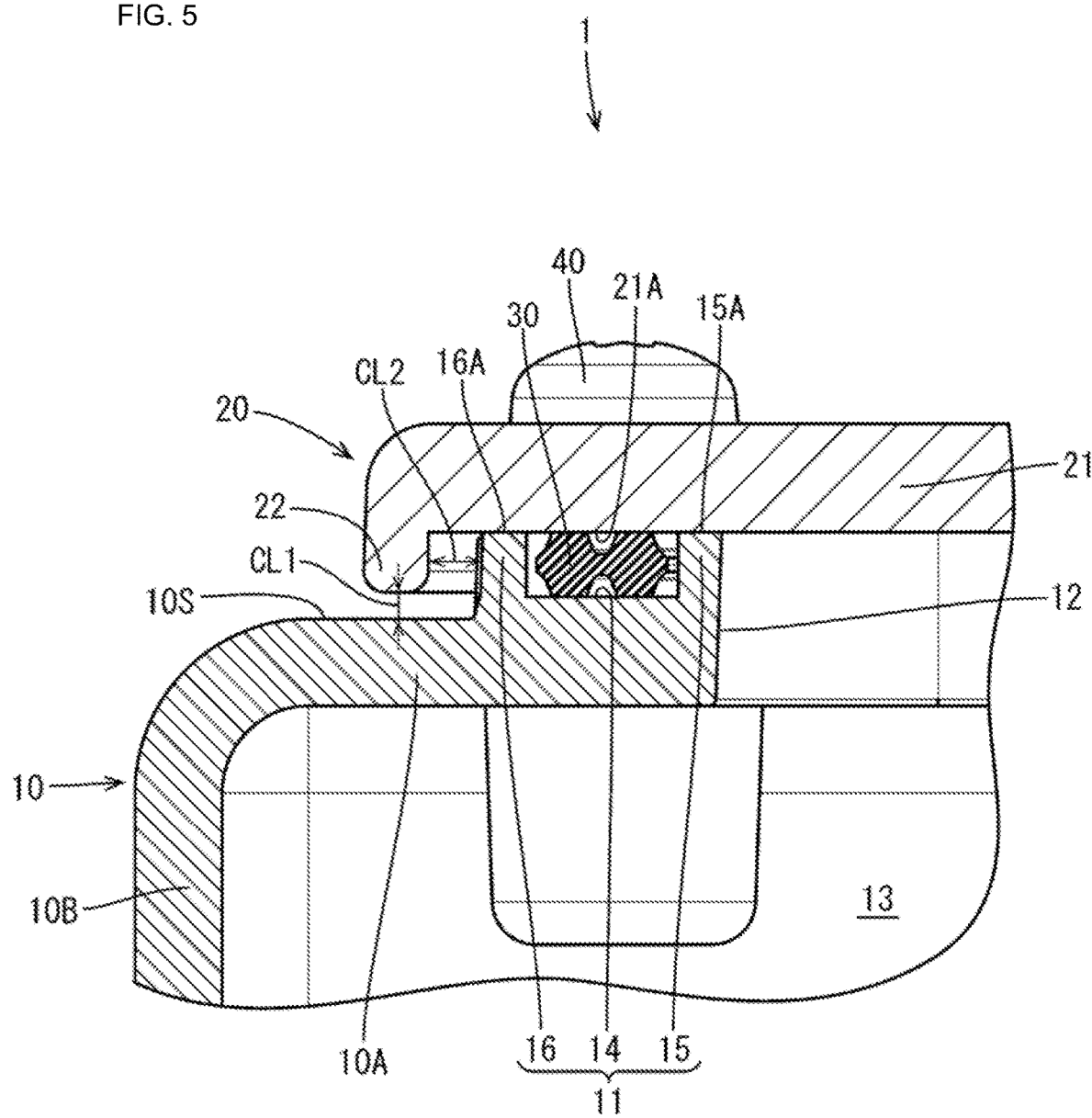
FIG. 5 is an enlarged cross-sectional view taken along a line A-A in FIG. 2, illustrating the vicinity of a gasket.
Figure 6:
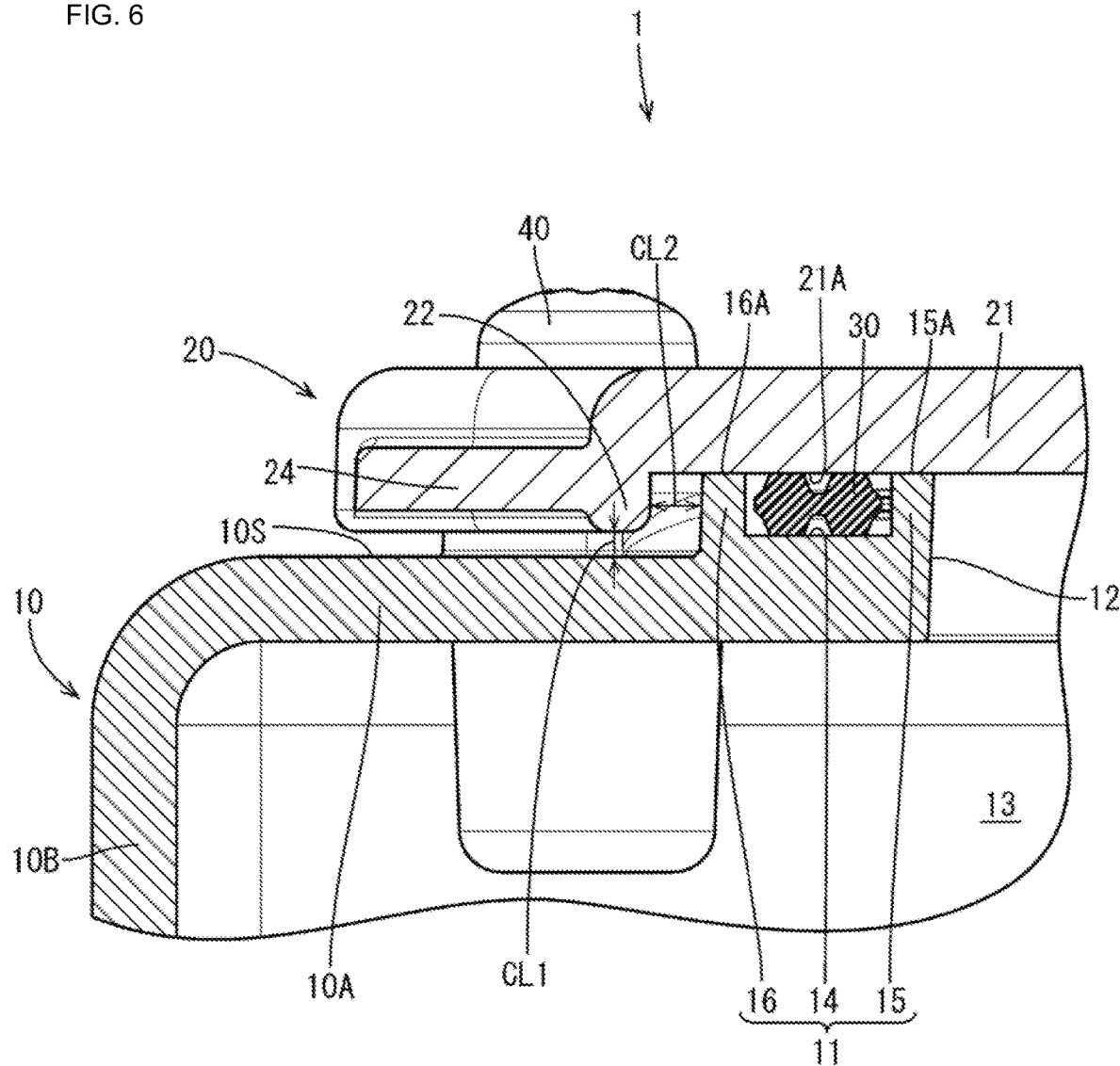
FIG. 6 is an enlarged cross-sectional view taken along a line B-B in FIG. 2, illustrating the vicinity of the gasket.

As shown in FIG. 3, a groove portion 11 is provided in a hole edge portion of the opening portion 12 formed in the top wall 10A, the groove portion 11 extending over the entire circumference of the opening portion 12. The groove portion 11 includes a case-side seal face 14, an inner wall 15 located on the inner side of the case-side seal face 14 in the radial direction, and an outer wall 16 located on the outer side of the case-side seal face 14 in the radial direction. Part of the inner wall 15 constitutes the opening portion 12. As shown in FIGS. 5 and 6, the case-side seal face 14 is a face perpendicular to the vertical direction, and is provided on the upper side relative to an outer surface 10S of the case 10 on the top wall 10A. The inner wall 15 and the outer wall 16 are provided protruding upward from the case-side seal face 14. An upper end 15A of the inner wall 15 and an upper end 16A of the outer wall 16 are provided at positions at the same height, and each have a face perpendicular to the vertical direction. The gasket 30 is fitted to the groove portion 11, and the case-side seal face 14 is in contact with the gasket 30 from below.

Four bolt fastening portions 17 are provided on the outer side, in the radial direction, of the groove portion 11 formed in the top wall 10A. Each bolt fastening portion 17 has an internal thread, and is designed such that a bolt 40 can be screwed therein. An un-shown nut is provided inside each of the bolt fastening portions 17. Although not shown, the upper ends of the bolt fastening portions 17 are located at the same height as the upper end 15A of the inner wall 15 and the upper end 16A of the outer wall 16.

Gasket

The gasket 30 is made of an elastic member such as rubber, and is ring-shaped, as shown in FIG. 2, when viewed in a plan view. As shown in FIGS. 5 and 6, the gasket 30 has a cross-sectional shape with two mountains on each of the upper and lower sides thereof, and is formed so as to be fitted to the groove portion 11. The size of the gasket 30 in the vertical direction is larger than the height of the inner wall 15 and the outer wall 16 from the case-side seal face 14 in a natural state, and the gasket 30 is configured to be compressed in the vertical direction by the case-side seal face 14 and a later-described cover-side seal face 21A when the electrical junction box housing 1 is assembled.

Cover, Cover-Side Seal Face, and Water Stop Wall

Figure 4:
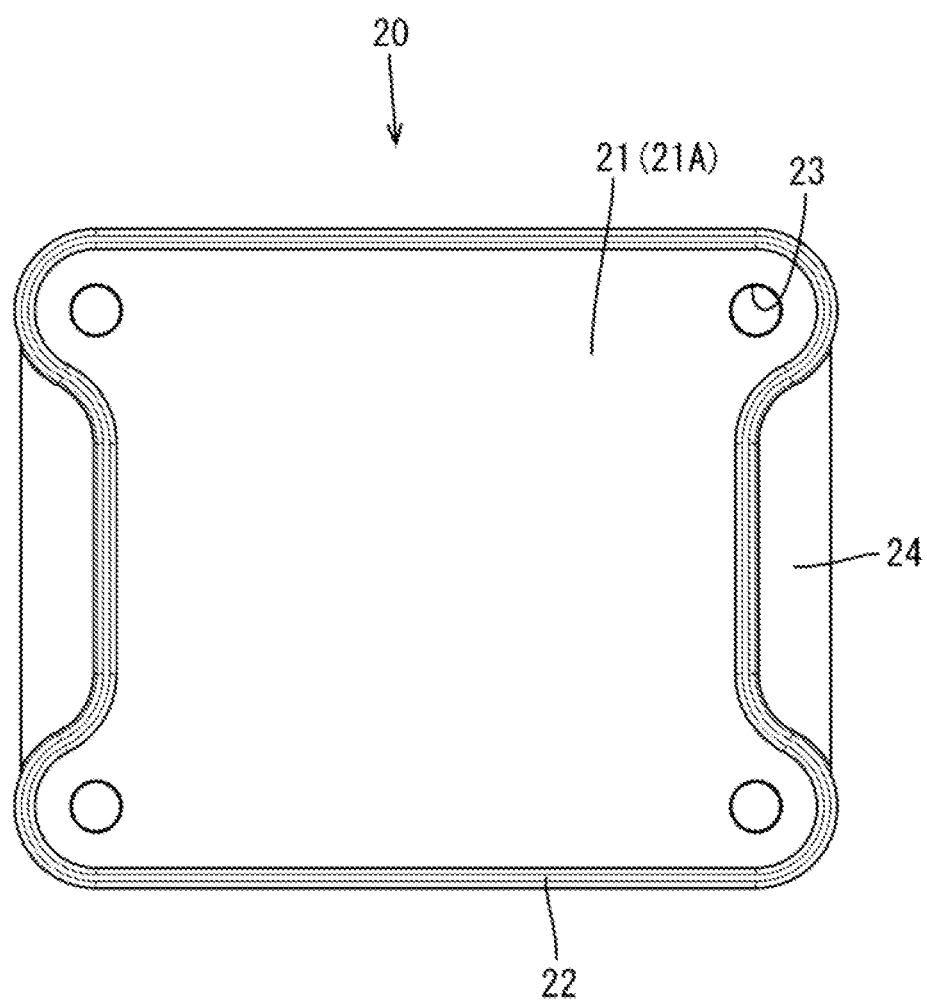
FIG. 4 is a bottom view illustrating a cover.

The cover 20 is made of a metal such as aluminum, and has, as shown in FIGS. 1 and 4, the shape of a plate that is thin in the vertical direction. As show in FIG. 4, the cover 20 is rectangular, and the central portion of the cover 20 serves as a cover main body 21. Through-holes 23 for bolt fastening are formed in the four corners of the cover main body 21. The lower face (on the front side of the paper plane of FIG. 4) of the cover main body 21 serves as the cover-side seal face 21A. The cover main body 21 is provided with, in the outer edge portion thereof, a water stop wall 22 that protrudes downward from the cover-side seal face 21A. The cover main body 21 is further provided with, in the outer edge portion thereof, flange portions 24 that extend to the outer side in the radial direction. The flange portions 24 are respectively provided at positions that correspond to the short sides of the rectangular cover 20, when viewed from the front side of the paper plane of FIG. 4.

First Clearance and Second Clearance

As shown in FIGS. 5 and 6, the cover-side seal face 21A is in contact with the upper end of the gasket 30 fitted to the groove portion 11, and compresses the gasket 30 together with the case-side seal face 14 in the vertical direction. The cover-side seal face 21A is in surface contact with the upper end 15A of the inner wall 15 and the upper end 16A of the outer wall 16, and is fixed by the bolts 40. In a state in which the electrical junction box housing 1 is closed by fastening bolts (hereinafter, referred to as "closed state"), a first clearance CL1 is formed in the vertical direction between the water stop wall 22 and the outer surface 10S on the top wall 10A. In the closed state, a second clearance CL2 is formed in the radial direction between the water stop wall 22 and the outer wall 16. Both the first clearance CL1 and the second clearance CL2 are preferably greater than or equal to 1 mm. With this, it is possible to prevent such a situation that, due to capillary action, water enters the first clearance CL1 and the second clearance CL2. Also, as shown in FIG. 6, the lower ends of the flange portions 24 are located at positions higher than the lower end of the water stop wall 22, and the capillary action of water is also unlikely to occur between the flange portions 24 and the outer surface 10S on the top wall 10A.

Assembly of Electrical Junction Box Housing

A substrate and a plurality of electronic components (not shown) are housed in the inner space 13 of the case 10. The gasket 30 is fitted to the groove portion 11 formed in the case 10. The cover 20 is put on the case 10 from above so that the through-holes 23 are aligned with the bolt fastening portions 17. The cover 20 is attached to the case 10 by inserting the bolts 40 into the through-holes 23 from above, and fastening the bolts to the bolt fastening portions 17. By further fastening the bolts 40, the gasket 30 is compressed in the vertical direction by the cover-side seal face 21A and the case-side seal face 14. In the closed state, in which the cover-side seal face 21A is in surface contact with both the upper end 15A of the inner wall 15 and the upper end 16A of the outer wall 16, the gasket 30 is in intimate contact with the cover-side seal face 21A and the case-side seal face 14 in a watertight manner. With this, the assembly of the electrical junction box housing 1 is complete.

Functions and Effects of Embodiment

According to the present embodiment, the following functions and effects are achieved.

The electrical junction box housing 1 according to the embodiment includes: the case 10 that is made of metal, and has the opening portion 12 that is open in a vertical direction; the cover 20 that closes the opening portion 12 from above; and the gasket 30 that is ring-shaped, and is fitted to the groove portion 11 formed in a hole edge portion of the opening portion 12, wherein the groove portion 11 includes the case-side seal face 14 that is in contact with the gasket 30 from below, the inner wall 15 that is located on an inner side of the case-side seal face 14 in a radial direction and protrudes upward, and the outer wall 16 that is located on an outer side of the case-side seal face 14 in the radial direction and protrudes upward, the cover 20 includes the cover-side seal face 21A that is in contact with the gasket 30 from above, and the water stop wall 22 that is located on an outer side of the cover-side seal face 21A in the radial direction and protrudes downward, the first clearance CL1 is formed in the vertical direction between the water stop wall 22 and the outer surface 10S of the case 10, and the second clearance CL2 is formed in the radial direction between the water stop wall 22 and the outer wall 16.

With such a configuration, since the outer wall 16 is provided protruding upward, water is unlikely to flow over the outer wall 16 and reach the case-side seal face 14 or the cover-side seal face 21A due to gravity. Also, since the first clearance CL1 and the second clearance CL2 are formed between the case 10 and the cover 20, capillary action is unlikely to occur and thus it is possible to further prevent water from reaching the upper side of the outer wall 16. Accordingly, even if the electrical junction box housing 1 is exposed to salt water, it is possible to suppress a decrease in waterproof performance that may occur due to corrosion.

According to the embodiment, the case-side seal face 14 is provided on the upper side relative to a face of the outer surface 10S of the case 10 that is opposed to the water stop wall 22.

With such a configuration, the outer wall 16 can be provided protruding further upward relative to the outer surface 10S of the case 10, and thus water is unlikely to flow over the outer wall 16 and reach the case-side seal face 14 or the cover-side seal face 21A.

According to the embodiment, the cover-side seal face 21A is in surface contact with both the upper end 15A of the inner wall 15 and the upper end 16A of the outer wall 16.

With this configuration, the case 10 and the cover 20 each have two contact surfaces, and thus it is possible to reliably attach the cover 20 to the case 10.

Other Embodiments

In the above-described embodiment, the upper end 15A of the inner wall 15 and the upper end 16A of the outer wall 16 are provided at the same height, but the present disclosure is not limited to this, and the upper end of the inner wall and the upper end of the outer wall may be provided at different heights.

In the above-described embodiment, the cover 20 includes the flange portions 24, but the present disclosure is not limited to this, and the cover does not necessarily include a flange portion.

In the above-described embodiment, the gasket 30 has a cross-sectional shape with two mountains on each of the upper and lower sides thereof, but the present disclosure is not limited to this, and the gasket may have any suitable cross-sectional shape.

What is claimed is:

1. An electrical junction box housing comprising:
a case that is made of metal, and has an opening portion that is open in a vertical direction;
a cover that closes the opening portion from above; and
a gasket that is ring-shaped, and is fitted to a groove portion formed in a hole edge portion of the opening portion,
wherein the groove portion includes a case-side seal face that is in contact with the gasket from below, an inner wall that is located on an inner side of the case-side seal face in a radial direction and protrudes upward, and an outer wall that is located on an outer side of the case-side seal face in the radial direction and protrudes upward,
the cover includes a cover-side seal face that is in contact with the gasket from above, and a water stop wall that is located on an outer side of the cover-side seal face in the radial direction and protrudes downward,
wherein the water stop wall is spaced apart from an outer surface of the case so as to define a first clearance, the first clearance is formed in the vertical direction between the water stop wall and an outer surface of the case, and
wherein the water stop wall is spaced apart from an outer surface of the outer wall so as to define a second clearance, the second clearance is formed in the radial direction between the water stop wall and the outer wall.

2. The electrical junction box housing according to claim 1, wherein the case-side seal face is provided on the upper side relative to a face of the outer surface of the case that is opposed to the water stop wall.

3. The electrical junction box housing according to claim 1, wherein the cover-side seal face is in surface contact with both an upper end of the inner wall and an upper end of the outer wall.

4. The electrical junction box housing according to claim 2, wherein the cover-side seal face is in surface contact with both an upper end of the inner wall and an upper end of the outer wall.

\* \* \* \* \*